Figure 1:
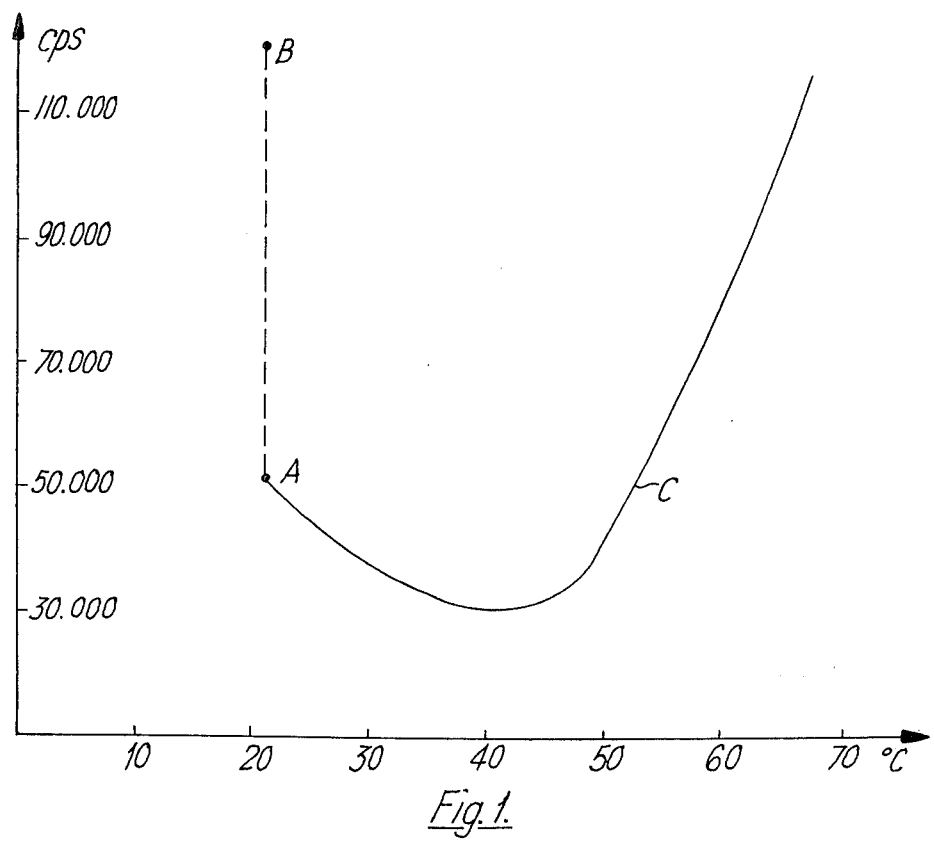

United States Patent [19]

Bertrandi

[11] 4,122,146

[45] Oct. 24, 1978

[54] FLEXIBLE SHELL OF PLASTICIZED POLYVINYL CHLORIDE

[75] Inventor: Luigi Bertrandi, Torino, Italy

[73] Assignee: ITT Industries, Inc., New York, N.Y.

[21] Appl. No.: 539,917

[22] Filed: Jan. 9, 1975

Related U.S. Application Data

[63] Continuation-in-part of Ser. No. 352,416, Apr. 19, 1973, abandoned.

[51] Int. Cl.² .................... B29C 5/12; B29C 13/00
[52] U.S. Cl. .................................. 264/245; 264/250; 264/255; 264/309; 264/DIG. 60
[58] Field of Search ............... 264/302, 309, 331, 309, 264/DIG. 60, 245, 246, 250, 255; 118/608, 612; 260/42, 49

[56] References Cited

U.S. PATENT DOCUMENTS

| | | | |
|---|---|---|---|
| 2,651,586 | 9/1953 | Cooper et al. | 264/DIG. 60 |
| 3,095,259 | 6/1963 | Smith | 264/302 |
| 3,151,196 | 9/1964 | Tipton | 264/302 |
| 3,161,436 | 12/1964 | Hood | 264/46.7 |
| 3,187,073 | 6/1965 | Bingham, Jr. | 264/302 |
| 3,190,944 | 6/1965 | Moore | 264/309 |
| 3,200,085 | 8/1965 | Guglielmo | 264/331 |
| 3,315,016 | 4/1967 | Wersosky et al. | 264/302 |
| 3,522,686 | 8/1970 | Gordon et al. | 264/309 |
| 3,632,545 | 1/1972 | Ferraro | 260/30.6 R |
| 3,705,228 | 12/1972 | Mattingly | 264/309 |

OTHER PUBLICATIONS

Randolph et al., Plastics Eng. Handbook, Reinhold, N. Y. (1960) pp. 119, 120, 284 & 285.
Bernahrdt, Processing of Thermoplastic Materials, Reinhold, N. Y. (1959) p. 19.

*Primary Examiner*—W.E. Hoag
*Attorney, Agent, or Firm*—J. B. Raden; H. J. Holt

[57] ABSTRACT

A unitary, three-dimensional flexible shell of plasticized polyvinyl chloride of substantially uniform thickness. The shell is produced by spraying a thin layer of a polyvinyl chloride plastigel comprising a dispersion of polyvinyl chloride in a plasticizer onto the surface of a three-dimensional mold corresponding to the outer face of the shell while the mold surface is maintained between room temperature and 100° C. The plastigel during use has a viscosity of 20,000 to 50,000 cps and at least 110,000 cps after 48 hours rest and contains no particles which are sedimentable at these viscosity levels. The layer of polyvinyl chloride is then heated in order to gel the layer.

9 Claims, 2 Drawing Figures

FLEXIBLE SHELL OF PLASTICIZED POLYVINYL CHLORIDE

This is a continuation-in-part of my application Ser. No. 352,416, filed Apr. 19, 1973 now abandoned.

The present invention relates to a method for producing flexible shells of polyvinyl chloride and to the shells so produced.

Flexible shells of plastic material are widely used for producing upholstered or padded articles, frequently as cushions and seat backs particularly for vehicles. Furthermore certain inner portions of vehicle bodies often have a stuffed lining for aesthetic or safety purposes. Linings of this type generally comprise a flexible shell or "skin" of suitable plastic material. It is common practice in articles of this type to provide a stuffing consisting of a foamed elastomeric or plastomeric material such as foamed polyurethane. Various techniques for producing the shell are available depending upon requirements.

Thus, the shells may be flexible plastic sheets imitating natural hides and typically consisting of a polyvinyl chloride (PVC) or polyurethane layer coated on a textile support (such as nylon jersey or textile). The component parts of these products, however, must be cut from a roll and then seamed or sealed to one another to form the three-dimensional product, which involves high labor costs. Also the mechanical strength of the products thus obtained is often impaired by the seams.

A technique used to make one piece three-dimensional products, involves the formation under vacuum of a thermoplastic resin sheet, the surface of which must be embossed if an imitation leather is to be produced. The shell thus obtained, however, is quite stiff and does not stand repeated stresses. Furthermore in deep moldings, the danger exists of local overstretching, thereby losing mechanical strength and embossing details. In addition, it is not possible to obtain "inlay" shells by this technique, i.e. shells having an exposed surface which comprises a flexible insert such as a textile material.

The reproduction of minute details, e.g. leather grain and stitching, on the surface of a molded PVC shell, requires a relatively high level of fluidity in the molding composition. On the other hand, a high level of fluidity creates a flow problem in molding large, unitary shapes having both horizontal and non-horizontal components. These contradictory viscosity requirements have been a major obstacle to the production of high quality three-dimensional PVC shells.

A number of methods have been suggested or employed to manufacture such large three-dimensional PVC shells from vinyl plastisols, including rotational molding, spray molding and slush molding. In order to reproduce fine details and grain on the surface of the shells, a plastisol with a high degree of fluidity is obtained by increasing the proportion of plasticizer to an amount exceeding 100 parts by weight for each 100 parts of PVC resin. This high degree of fluidity causes the plastisol, when working with a fixed mold during gelling, to run along the vertical walls and gather on the bottom. With slush or rotational molding, the plastisol drips, flows or forms layers. In addition, the large amount of plasticizer creates an unpleasant feeling to the touch in the finished shell and a fogging problem due to evaporation of the plasticizer. The result is a product which does not have uniform thickness, which has low mechanical strength and undesirable physical characteristics.

In addition, it is impossible to obtain multicolored effects or to put inserts in shells made by either slush or rotational molding techniques. Multicolors or inserts are theoretically possible by spraying, but this technique requires that the molds be maintained at over 170° C and this renders such processes impractical because of the difficulty of working with such hot molds. Moreover, it does not allow for a true reproduction of the grain.

Polyurethane may be used for forming aesthetically pleasing shells. However, the mechanical strength of polyurethanes is less than that of PVC and polyurethane is therefore primarily useful for decorative shells rather than, e.g. seats.

It is accordingly a principal object of the present invention to produce a large, three-dimensional flexible PVC shell having uniform thickness, excellent mechanical properties and appearance and a surface which accurately reproduces fine design detail.

It is an additional object of this invention to provide a PVC shell of the foregoing properties which is obtainable in multicolors or with inserts, used internally as reinforcement or externally for aesthetic reasons.

It is an additional object of this invention to provide a simple and economical process for producing large flexible, plasticized PVC shells.

The above and other objects of this invention are achieved by spraying onto a three-dimensional mold surface corresponding to the outer face of the shell to be obtained, a thin layer of a polyvinyl chloride plastigel comprising a dispersion of polyvinyl chloride in a plasticizer and then gelling and baking the layer. The PVC plastigel has, at the moment of its use, a viscosity of 20,000 to 50,000 cps and a viscosity after 48 hours rest of at least 110,000 cps. The plastigel should also be substantially free of any metal or other particles which are sedimentable at said viscosity levels. The mold surface is maintained at a temperature in the range of from room temperature to about 100° C, preferably at least 60° C. The plastigel viscosity is preferably from 30,000 to 45,000 cps at the moment of use, and at least 120,000 cps after 48 hours rest.

The PVC shells produced by the foregoing method are of uniform thickness because the viscosity of the plastigels is sufficient to prevent flow and run-off. The appearance and touch characteristics and chemical properties are superior to prior PVC shells because of the relatively low level of plasticizer content — less than 100 parts and usually about 40 to 60 parts by weight per 100 parts of PVC resin. The mechanical properties are excellent in tensile strength, tear resistance and elongation. Because of the high viscosity of the plastigel at rest and the relatively low temperature of the mold, inserts may be easily added to the shells for reinforcement or appearance and shells having sharply — demarcated zones of different colors may be made.

The term polyvinyl chloride is intended to include within its scope vinyl chloride homopolymers as well as related copolymers containing minor proportions of other monomers, such as vinyl acetate, vinylidene chloride, styrene and other well known copolymeric ingredients. The term shell is intended to include sheaths or skins of the type and thickness, normally from about 0.5 to 4 mm, used for upholstery covers. A unitary shell will normally have both horizontal and vertical or subvertical wall sections and the latter are herein identified as "three-dimensional" shells.

Figure 2:
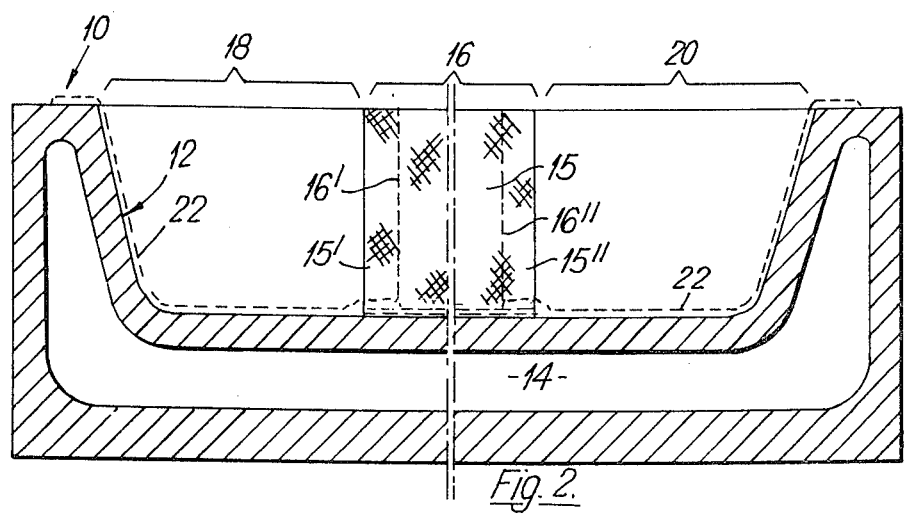

The invention will be better understood in connection with the accompanying drawing in which FIG. 1 is a viscosity diagram of a plastigel suitable for the present invention; and FIG. 2 is a diagrammatic section of a mold as used in one embodiment of the invention.

The above quoted viscosity values of 20,000 to 50,000 cps relates to "the moment of use". These conditions are shown in FIG. 1 at A, in which, for example, a plastigel has a viscosity of 50,000 cps at 21° C. Leaving this plastigel stand still for 48 hours at the same temperature, its viscosity increases and must reach at least 110,000 cps; to drop it to 50,000 cps it is sufficient to stir it efficiently for a few minutes. These changes of viscosity (thixotropy) are shown by the verticle line A-B in FIG. 1.

In practice, point A stands for the conditions of the PVC plastigel in the feed tank of a spray gun during the carrying out of the present method. If the tank capacity is comparatively great relative to the delivery thereof, it is convenient to place in the tank a stirrer to avoid undesired subsequent increases of viscosity.

Moreover, curve C in FIG. 1 shows that, upon heating, viscosity decreases slowly to a minimum and then goes up quickly to the hardening point of the plastigel. As a result, even if a plastigel in condition A is so viscous as not to lead to flowing off on the mold surface immediately after its spraying in form of a layer of, for example, 2 or 3 mm in thickness, which is typical of the present method, yet flowing off (though limited) may appear when, through heating of the mold for the purposes of gelling and baking, plastigel sprayed in a thicker layer undergoes the range of temperature corresponding to the minimum of viscosity. The method according to the present invention can avoid the risk by keeping the temperature of the mold, during the spraying, at a substantially higher level, preferably in the range of 60° to 100° C. In order to keep the temperature at the desired level any known means obvious to a person skilled in the art may be used, such as resistors embedded in the mold, jackets for circulating a heating liquid, etc. If the mold has a sufficiently high heat capacity, it may be preheated in an oven at the desired temperature and the thus accumulated heat will avoid any remarkable drop in temperature during the spraying.

The plastigel employed must include a reasonably limited percentage of plasticizer if an oozing of the finished shell surface is to be avoided. 40 to 60 parts by weight of plasticizer for 100 parts by weight of resin (PVC) are typically suitable. Viscosity increases with the molecular weight of the dispersed PVC, as well known to the persons skilled in the art. Moreover, in a plastigel there are gelling charges, sjuch as betonite or silica gel, which raise the viscosity of the plastigel itself. By adjusting these factors as well as the nature and the quantity of the stabilizer, it is possible to easily obtain plastigels suitable for the method according to the invention. If necessary, a suitable amount of a viscosity depressant may be added. In any case, dyes or pigments will also frequently be present, and possibly other typical and well known components of polyvinyl plastigels.

Preferably, low volatility plasticizers are used, such as dioctyladipate (DOA), dioctylsebacate (DOS), diisodecyladipate (DIDA) and trimellitates. In addition, 10 parts by weight at the most of polymer plasticizers, such as epoxydized plasticizers, may be present.

The high viscosity of plastigels employed in connection with the present method is of importance for the type of equipment required for the spraying. Thus, first of all, the supply tank of the gun must be pressure-resisting, so that it may be pressurized at about 4 to 6 atmospheres; at such pressure compressed air must be supplied to the gun. In these conditions, with a nozzle having a diameter of 2 to 2.5 mms, the optimum spraying distance is about 80 cms from the mold surface.

The active mold surface preferably consists of copper, nickel or nickel-plated copper. Usually it will be pattern engraved, such as for reproducing in negative the "texture" of natural hides.

In FIGS. 2, 10 is a mold whose active, concave surface 12 reproduces the outer face of a cushion shell for a seat. Such surface may be kept at the desired temperature by means of a flow of oil or other diathermic liquid through the jacket 14.

Assume that the shell to be produced is an "inlay" shell, including a rectangular cloth strip 15 extending from the front to the back of the shell. Strip 15 is therefore laid on a central zone 16 as wide as the mold and is kept tight to surface 12 of the mold through a pressing member (not illustrated). This pressing member presses strip 15 only between the lines 16' and 16", so as to leave uncovered the opposite longitudinal edges 15' and 15" of the strip, being for example 4 to 5 mms wide. The mold is at a temperature of $x°$ C within the above indicated range. Then on the uncovered zone 18 and 20 of the surface 12 of the mold and on the edges 15' and 15" of the strip 15 a PVC plastigel as herein defined is sprayed, so as to form a continuous covering layer 22 having for example a thickness of 1 to 1.5 mms. It is advisable to carry out the spraying quickly for example with a covering speed of about $0.3 m^2/min$.

A suitable plastigel has the following composition by weight:

High molecular weight PVC — 100 parts
DOS — 15 parts
Trimellitate — 35 parts
Stabilizer — 2.5 parts
Epoxy-plasticizer — 3 parts
Titanium oxide — 2 parts
Geller (bentonite) — 2 parts
Viscodepressant — 2 parts The initial viscosity of this plastigel is of about 35,000 cps; after 24 hours it reaches about 160,000 cps, but it drops again to 30,000 to 35,000 cps after 15 minutes stirring; plastigel is employed at the latter viscosity.

This plastigel is preferably prepared by forming apart a dispersion of geller in 10 parts (of a total of 15 parts) of DOS, and a second dispersion including all remaining components and the residual 5 parts of DOS. This is done in containers provided with suitable stirrers, preferably of the screw type (with high cutting effect). The two dispersions are then thoroughly dispersed in one another.

If the textile strip 15 is used only as an ornament and not as a "resistant element" for the shell, after the above described operations the presser is removed and the spraying is carried on until the whole strip is evenly covered.

Gelling and baking of coating layer 22 are carried out in a well known manner, through heating. For example 2 minutes at 300° to 320° C are sufficient for a complete baking. After cooling, the shell thus obtained is withdrawn from the mold.

Instead of textile insert 15, a corresponding insert of PVC can be used, having a color different from that of layer 22 which covers the zones 18 and 20 of the mold. This result can be obtained with the masking technique. For example, the zones 18 and 20 can be masked and coating layer ww is formed from the zone 16 by spraying a plastigel of a desired color and operating in the above described conditions. The zones 18 and 20 are unmasked and the layer 22 is formed on these zones too, by spraying a plastigel of another color and, in case, coating the material which already covers the zone 16.

It should be understood that, in any case, inserts may be more than one and of a form different from that illustrated in the drawing.

Finally, the most simple case is that of a shell without any insert. In this case obviously the whole surface 12 of the shell is sprayed with plastigel, according to the above explained method.

A particular advantage of the method according to the invention is the possibility of obtaining a shell with a built-in stiffener or reinforcement. To this end, spraying is carried out in two stages. During a first stage, and whether the shell has an insert such as 15 or not, the resin layer 22 is formed only for a convenient part of its thickness. The partial coat thus formed is then covered with a grating or textile of stiffening fibres (which easily sticks to the already sprayed resin) and one goes on with the formation of layer 22 by spraying the plastigel through and onto said grating in order to embed the latter in the finished layer 22. As stiffening grating, a gauze, for example, of natural or synthetic fibres may be used, resistant to the baking conditions of layer 22.

When it is not essential that stiffening fibres are completely embedded in the resin layer 22, it is possible, as a variation, to form said layer in a single stage and to lay the fibers (in form of a gauze or randomly) on the surface of the freshly formed coat, so that the fibres stick to said surface. In case short fibres are laid through a blowing action, the excess of fibres can be removed for example through brushing.

If the shell is to be lastingly joined to a synthetic foam stuffing, it may be convenient to form the stuffing while the shell is still in the mold 10, i.e. before its withdrawal from the mold. This can be done according to a well known technique, by pouring into the shell cavity a metered amount of a foam forming polyurethane compound, by closing the mold 10 with a lid member and, if necessary, by putting it into an oven or simply by heating the mold to the desired temperature through its heating jacket 14.

Shells obtained according to the present method have an excellent touch and appearance, which were not previously obtainable with PVC plastigel. Typical mechanical characteristics are as follows:

Ultimate tensile stress (Kg/cm²) — 75
Ultimate elongation (%) — 500
Ultimate tearing stress (Kg/cm) — 3.5

I claim:
1. A method for producing a three-dimensional shell of plasticized PVC comprising
   preparing a polyvinyl chloride plastigel comprising a dispersion of polyvinyl chloride in a plasticizer,
   spraying a thin layer of said plastigel onto the surface of a three-dimensional mold while the mold surface is maintained between room temperature and 100° C.,
   said plastigel having during use of viscosity of 20,000 to 50,000 cps, the viscosity of said plastigel being at least 100,000 cps after 48 hours rest, said plastigel containing no particles which are sedimentable at said viscosity levels,
   heating said layer to a temperature substantially above 100° C. in order to cure said layer of plastigel thereby forming a three-dimensional PVC shell, and
   removing said shell from said mold.
2. The method of claim 1 in which the viscosity of the plastigel during use is 30,000 to 45,000 cps.
3. The method of claim 1 in which the surface of the mold is maintained during spraying at a temperature of at least 60° C.
4. The method of claim 1 wherein the plastigel is agitated during spraying to maintain its viscosity during use at 20,000 to 50,000 cps.
5. The method of claim 1 having 40 to 60% by weight, based on the weight of polyvinyl chloride, of plasticizer.
6. The method of claim 1 for producing a shell having an integral textile insert in which a textile insert is maintained on a zone of the mold surface and the plastigel is sprayed onto the insert edges and the remaining surfaces of the mold to form a shell containing an integral textile insert.
7. The method of claim 5 in which the entire insert surface is sprayed with plastigel to form a shell containing an integral textile reinforcement.
8. The method of claim 1 for producing a multicolored shell having sharply — demarcated zones of different colors in which a first zone of the mold surface is masked, the plastigel is sprayed onto the remaining zone of the mold surface with a plastigel of a given color, the first zone is unmasked and sprayed with a layer of plastigel of another color.
9. The method of claim 1 for producing a reinforced shell comprising the steps of spraying a part of the thickness of said layer of plastigel onto the surface of the mold, laying on the partial coat a grating of reinforcing fibers, and spraying plastigel through and onto said grating to complete the layer of plastigel.

* * * * *